May 6, 1952        H. H. HICKS        2,595,850

DENTAL APPLIANCE

Filed July 10, 1950

INVENTOR.
HADLEY H. HICKS
BY
Pattison Wright & Pattison
ATTORNEYS

Patented May 6, 1952

2,595,850

UNITED STATES PATENT OFFICE 2,595,850

DENTAL APPLIANCE

Hadley H. Hicks, Bisbee, Ariz.

Application July 10, 1950, Serial No. 172,847

9 Claims. (Cl. 32—63)

This invention relates to an improved dental appliance and more particularly and specifically to an apparatus or tool which is useful and of great assistance in the filling of teeth.

An object of the invention is the provision of a device of the character described which is extremely simple of construction and operation and is sufficiently small as to permit several of the devices, if desired, to be placed in the mouth of the patient at the same time.

Another object of the invention is the provision of a device of the character described which is of a construction calling for no close tolerances in manufacture, and although operating on a rotary principle in respect to one of its functions, requiring no threads.

A still further object of the invention is the provision of a device of the character described which may be utilized with or on the teeth of any size, a tooth standing alone or a tooth between two other teeth, and may be equally well used upon upper and lower front teeth irrespective of the position of the cavity to be filled.

A still further object of the invention is the provision of an appliance of the character described which requires no lubrication, is easy to sterilize, is self-locking when finally adjusted, is durable and highly efficient, and is comparatively cheap of manufacture due to its simplicity.

Other objects, advantages and improvements of the invention appear from the following description and will be understood by those familiar with the art.

In the drawings which illustrate an embodiment of the inventive concept:

Figure 1:
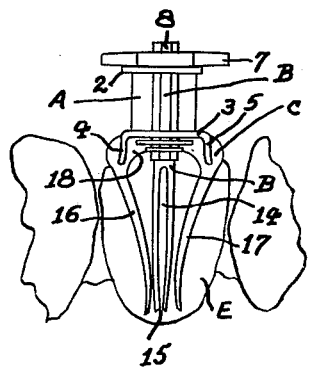
Fig. 1 is a view in front elevation showing the appliance in use with a tooth.
Figure 2:
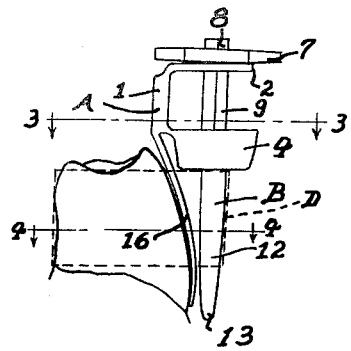
Fig. 2 is a view in side elevation, the band being shown in dotted lines.

In the filling of teeth it is important that the filling be tightly pressed into the cavity so that a smooth even filling is produced which will prevent air leakage and consequent later decay of the tooth. It is also desirable and most helpful to maintain this pressure for several minutes. The present invention provides a device which will accomplish the foregoing and which can be quickly and easily operated by the dentist and without inconvenience to or help from the patient.

Describing generally the parts comprising the appliance, A is a frame, B a shaft rotatable in the frame, C a pressure plate or foot and D a flexible strip which may be composed of metal, a suitable resinous substance or any other material having the necessary degree of flexibility and strength. If desired this strip or tape can be transparent.

Describing the invention in detail, the frame comprises a vertical leg 1 and spaced apart and substantially parallel horizontally extending legs 2 and 3. The leg 3 at its opposite edges has depending ears 4 and 5 which are for the purpose of providing a finger-hold for manipulation of the appliance when it is being put into use. The legs 2 and 3 are provided with aligned hexagonal openings 6 in which is freely rotatably mounted the shaft B.

The shaft B above the upper frame leg 2 is provided with an enlarged hexagonal nut 7 suitably non-rotatably secured to the shaft and the upper and outer shaft end 8 is in the form of a nut to which, when desired, a suitable wrench can be applied. The upper portion of the shaft is of a hexagonal shape in cross sectional configuration, as clearly appears at 9. Immediately below the lower frame leg 3 the shaft carries a washer 10. Below the washer the shaft is grooved to receive a ring 11. The ring and washer support the frame against downward movement on the shaft. The lower portion 12 of the shaft is of circular shape provided with a rounded lower end 13. The shaft portion 12 is provided with a longitudinally extending slot 14 having a lower open end 15.

The pressure plate or foot is lyre-shaped and comprises downwardly and inwardly curved opposed legs 16 and 17 the upper ends of which are interconnected by a bridge or cross piece 18 provided with an upwardly extending tongue 19 having a sliding telescopic frictional attachable and detachable fit with the channelway or socket 20 formed on the back of the leg 1 of the frame by inwardly and downwardly bent frame portions or edges 21 and 22.

Figure 4:
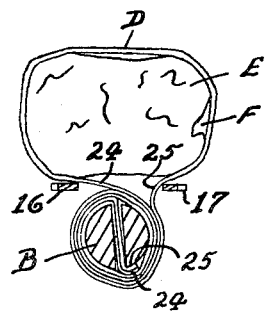
Fig. 4 is a horizontal sectional view on the line 4—4 of Fig. 2, the band and tooth being shown in full line.
Figure 5:
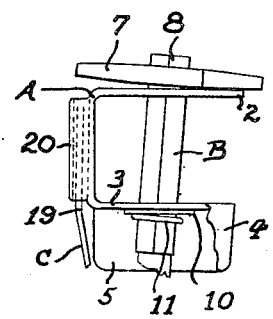
Fig. 5 is a detail view in side elevation, the parts being shown in the positions they assume when the band is under tension.

The strip or tape D is of a width slightly less than the length of the shaft slot 14 and is of sufficient length to completely encircle a tooth and have its ends extend through the shaft slot and wrap around the shaft as illustrated in Fig. 4 of the drawings.

The frame, shaft and pressure foot are preferably made of stainless steel for hygenic reasons but could be composed of other suitable materials. Due to their length and comparatively small breadth the pressure foot legs are resilient.

Figure 3:
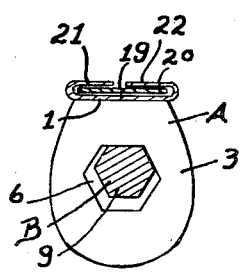
Fig. 3 is a horizontal sectional view on the line 3—3 of Fig. 2, showing of the tooth being omitted.
Figure 6:
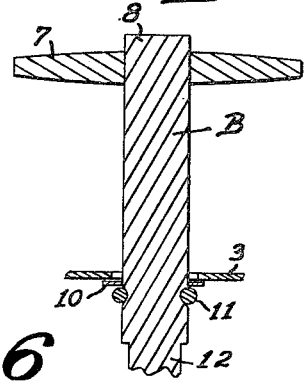
Fig. 6 is a fragmentary vertical sectional view of the upper end of the shaft.

Cavities can occur any place in a tooth but for the purposes of illustrating the operation of the appliance a tooth E is illustrated, see Fig. 4, as having a cavity F in one of its sides. It will be seen that the strip or tape D is carried around the tooth and the free ends 24 and 25 of the strip are brought to the front of the tooth. The legs 16 and 17 are placed to straddle the ends of the strip. The frame is then placed in position with the pressure plate or foot tongue in the frame socket, as illustrated in Fig. 3, and the free ends of the strip are caused to pass through the slot 14 in the shaft. Tension, throughout this time, is maintained on the strip by the dentist but with the parts in the positions described the shaft 12 is caused to rotate by manipulation of the shaft nut 7. Rotation can be in either direction and upon rotation the strip is wound about the shaft in the manner illustrated in Fig. 4 and rotary movement is continued until the strip is pulled tightly about the tooth and over the cavity with the desired tension. The appliance then automatically maintains itself in place and the shaft is frictionally held against rotation. This occurs by reason of the fact that the tension of the strip on the lower end of the shaft pulls the lower shaft end toward the tooth thus causing a binding of the shaft in the opening 6 in the lower shaft leg 3, as illustrated in Fig. 6. Here it will be seen that one of the faces of the shaft is forced into abutment with one of the faces of the opening. Six locking or binding positions are provided. Additionally, the tilting of the shaft causes the under face of the nut 7 to bind against the upper face of the upper leg 2 of the frame. It will be obvious that the strip D will exert a pressure on the filling in the cavity F. The appliance can be maintained in this pressure applying status until the tension is removed by the dentist.

Where the space is such as to make it difficult to manipulate the large nut 7, rotation of the shaft can be accomplished by using a wrench on the upper shaft end 8.

It has been found that as many as three cavities on one tooth may be filled in one operation, for instance, mesial, distal, and gingival. Additionally complex cavities involving more than one surface can be efficiently handled. Furthermore, the pressure foot may be removed from the frame socket and turned over and reinserted in the socket when it is found necessary to apply the pressure foot to the lingual or tongue side of a tooth.

What I claim is:

1. A dental appliance comprising, a flexible band adapted to encircle a tooth, a frame having a portion engaging a face of the tooth, a shaft normally freely rotatable in the frame, means to secure the ends of the band to the shaft, means to rotate the shaft to wind the band ends thereon to tighten the band to the tooth, and the shaft upon the tightening of the band tilting and moving into frictional engagement with the frame to hold the shaft against rotation.

2. A dental appliance comprising, a flexible band adapted to encircle a tooth, a frame, a shaft normally freely rotatable in the frame, a pressure plate carried by the frame and adapted to engage a face of the tooth, said plate having a pair of arms adapted to straddle the ends of the band with the band being disposed between the plate and the tooth face, the shaft being provided with a longitudinally extending slot through which the band ends extend, means to rotate the shaft to wind the band ends thereon to tighten the band to the tooth and to simultaneously press the plate toward the tooth face, and means operating automatically upon the tightening of the band to bring the shaft into frictional engagement with the frame to hold the shaft against rotation.

3. A dental appliance comprising, a flexible band adapted to encircle a tooth, a substantially U-shaped frame with the bottom leg of the U constituting the vertical leg of the frame, the other legs of the frame being apertured to loosely rotatably receive apertured shaft, a pressure plate having a pair of spaced legs shaped to approximate the outer contour of an average tooth, the ends of the band extending outwardly between the legs of the plate and through the aperture of the shaft, means to rotate the shaft to wind the band ends thereon to tighten the band about the tooth, and the tightening of the band acting to frictionally bind the shaft in the frame to hold the shaft against other than manual rotation.

4. A construction as defined in claim 3 wherein, the vertical leg of the frame is provided with a socket for detachably frictionally receiving an end of the pressure plate.

5. A construction as defined in claim 4 wherein, the opposite sides of the bottom frame leg are bent downwardly to provide ears adapted to be engaged by the fingers of the operator to facilitate placement and adjustment of the appliance.

6. A construction as defined in claim 3 wherein, the apertures in the frame legs are of hexagonal shape and the shaft portion extending through said apertures is similarly shaped but free to rotate in the apertures.

7. A dental appliance for use in combination with a flexible band adapted to encircle a tooth comprising, a substantially U-shaped frame the bottom leg of the U constituting the vertical leg of the frame, said vertical leg on its rear side being provided with a socket, the other legs of the frame being provided with aligned hexagonal shaped apertures, a shaft extending through the frame apertures and having a hexagonal shaped portion freely rotatable in the apertures, said shaft above the upper frame leg being provided with an enlarged operating nut, the shaft below the lower frame leg being provided with an aperture, a pressure plate embodying a pair of spaced resilient legs having their upper ends interconnected by a bridge provided with an upwardly extending end adapted to telescopically detachably frictionally engage the frame socket, the parts operating as described upon rotation of the shaft when the band ends extend through the shaft aperture.

8. A dental appliance designed to adapt a flexible band in encircled relation about a natural tooth and comprising a frame structure, a shaft normally free to rotate in said frame structure and having means arranged to engage said flexible band in secured relation thereto, means arranged to rotate said shaft and thereby wind said band thereon whereby to tightly draw said band about the tooth surface, and means independent of said winding means arranged to automatically engage the shaft with said frame to prevent reverse rotation of said shaft.

9. A matrix retainer designed to engage a matrix band about the surface of a natural tooth and comprising a frame structure extended to engage the tooth surface and affording a guide for said matrix band, a shaft normally free to rotate in said frame and having a longitudinally extending slot through which said band may be extended and thereby retained, means arranged to effect rotation of said shaft to wind the band thereon and to thereby draw said band taut about the tooth surface and to cause the frame extension to press against said tooth with the band interposed, and means automatically actuated by said band only during its ultimate tautness to hold said shaft against any tendency of reverse rotation.

HADLEY H. HICKS.

REFERENCES CITED

The following references are of record in the file of this patent:

UNITED STATES PATENTS

| Number | Name | Date |
|---|---|---|
| 613,947 | Strout | Nov. 8, 1898 |
| 1,072,015 | Maker | Sept. 2, 1913 |
| 2,218,774 | Strell | Oct. 22, 1940 |